United States Patent
Bonforte (10) Patent No.: US 11,062,268 B2
(45) Date of Patent: *Jul. 13, 2021

(54) PRESENTING FAVORITE CONTACTS INFORMATION TO A USER OF A COMPUTING DEVICE

(71) Applicant: VERIZON MEDIA INC., New York, NY (US)

(72) Inventor: Jeffrey Bonforte, San Francisco, CA (US)

(73) Assignee: VERIZON MEDIA INC., New York, NY (US)

( * ) Notice: Subject to any disclaimer, the term of this patent is extended or adjusted under 35 U.S.C. 154(b) by 140 days.

This patent is subject to a terminal disclaimer.

(21) Appl. No.: 16/132,740

(22) Filed: Sep. 17, 2018

(65) Prior Publication Data
US 2019/0019156 A1    Jan. 17, 2019
US 2019/0325396 A9    Oct. 24, 2019

Related U.S. Application Data

(63) Continuation of application No. 13/528,697, filed on Jun. 20, 2012, now Pat. No. 10,078,819.
(Continued)

(51) Int. Cl.
*G06F 3/00*      (2006.01)
*G06Q 10/10*    (2012.01)
(Continued)

(52) U.S. Cl.
CPC ......... *G06Q 10/107* (2013.01); *G06F 3/0481* (2013.01); *G06Q 50/01* (2013.01); *G06F 3/0482* (2013.01)

(58) Field of Classification Search
CPC .... G06Q 10/107; G06Q 50/01; G06F 3/0481; G06F 3/0482
See application file for complete search history.

(56) References Cited

U.S. PATENT DOCUMENTS 7,289,614 B1    10/2007    Twerdahl et al.
7,539,676 B2    5/2009    Aravamudan et al.
(Continued)

FOREIGN PATENT DOCUMENTS

KR      1020090068819      6/2009

OTHER PUBLICATIONS

European Patent Application No. 12801970.0, Extended Search Report, dated Oct. 23, 2014.

*Primary Examiner* — Kieu D Vu
*Assistant Examiner* — Andrew Chung
(74) *Attorney, Agent, or Firm* — James J. DeCarlo; Greenberg Traurig, LLP (57) ABSTRACT

Systems and methods to present information to a user regarding favorite contacts of the user. In one embodiment, a method includes: storing a plurality of person profiles for persons referenced in communications received by a user of a computing device; selecting, using at least one processor, a set of contacts from the plurality of person profiles based on a relevancy ranking, wherein the set of contacts is selected for display to the user on the computing device; and organizing, using the at least one processor, the set of contacts into at least two time groups, each time group associated with a different time period, wherein contacts will be displayed to the user within each time group based on a relevancy ranking for each contact within the time group.

20 Claims, 3 Drawing Sheets

Related U.S. Application Data (60) Provisional application No. 61/499,652, filed on Jun. 21, 2011.

(51) Int. Cl.
*G06F 3/0481* (2013.01)
*G06Q 50/00* (2012.01)
*G06F 3/0482* (2013.01)

(56) References Cited

U.S. PATENT DOCUMENTS

| | | | |
|---|---|---|---|
| 7,907,122 B2* | 3/2011 | LaPointe | G06F 3/0489 345/169 |
| 7,925,690 B2 | 4/2011 | Smith et al. | |
| 8,156,098 B1* | 4/2012 | Landsman | G06Q 30/00 707/706 |
| 8,348,765 B1* | 1/2013 | Thakkar | A63F 13/12 463/42 |
| 8,363,803 B2 | 1/2013 | Gupta | |
| 8,365,235 B2 | 1/2013 | Hunt et al. | |
| 8,392,836 B1 | 3/2013 | Bau et al. | |
| 8,412,174 B2 | 4/2013 | Khosravi | |
| 8,606,335 B2 | 12/2013 | Ozaki | |
| 9,088,808 B1* | 7/2015 | He | H04N 21/251 |
| 9,413,866 B2* | 8/2016 | Kraft | G06F 16/2477 |
| 2002/0078090 A1 | 6/2002 | Hwang et al. | |
| 2002/0178163 A1* | 11/2002 | Mayer | G06F 16/951 |
| 2003/0041030 A1 | 2/2003 | Mansfield | |
| 2003/0093405 A1* | 5/2003 | Mayer | G06F 16/951 |
| 2003/0149675 A1* | 8/2003 | Ansari | A63F 13/12 706/2 |
| 2003/0156133 A1* | 8/2003 | Martin | H04M 15/00 715/747 |
| 2003/0158827 A1* | 8/2003 | Ansari | H04N 21/4751 706/12 |
| 2003/0163363 A1* | 8/2003 | Pratte | G06Q 40/02 705/7.29 |
| 2004/0122810 A1* | 6/2004 | Mayer | G06F 16/951 |
| 2004/0210827 A1 | 10/2004 | Burg et al. | |
| 2005/0032527 A1* | 2/2005 | Sheha | H04W 4/029 455/456.1 |
| 2005/0159970 A1 | 7/2005 | Buyukkokten et al. | |
| 2005/0165825 A1* | 7/2005 | Turski | G06F 16/148 |
| 2006/0031772 A1* | 2/2006 | Valeski | H04L 51/04 715/751 |
| 2006/0095331 A1 | 5/2006 | O'Malley et al. | |
| 2007/0180392 A1* | 8/2007 | Russo | G06F 3/0482 715/765 |
| 2008/0134081 A1 | 6/2008 | Jeon et al. | |
| 2008/0147639 A1 | 6/2008 | Hartman et al. | |
| 2008/0189122 A1 | 8/2008 | Coletrane et al. | |
| 2008/0244681 A1* | 10/2008 | Gossweiler | H04N 21/235 725/133 |
| 2008/0256098 A1* | 10/2008 | Kim | G06Q 10/00 |
| 2008/0259022 A1* | 10/2008 | Mansfield | G06F 3/0237 345/156 |
| 2008/0263457 A1* | 10/2008 | Kim | H04M 1/72544 715/753 |
| 2009/0100384 A1 | 4/2009 | Louch | |
| 2009/0204908 A1* | 8/2009 | Ganz | G06Q 10/10 715/757 |
| 2009/0217178 A1 | 8/2009 | Niyogi et al. | |
| 2009/0228555 A1* | 9/2009 | Joviak | G06Q 10/107 709/205 |
| 2009/0244023 A1* | 10/2009 | Kim | G06F 3/0488 345/173 |
| 2009/0299824 A1 | 12/2009 | Barnes, Jr. | |
| 2009/0315848 A1* | 12/2009 | Ku | G06F 3/0416 345/173 |
| 2010/0015954 A1 | 1/2010 | Yang | |
| 2010/0062753 A1 | 3/2010 | Wen et al. | |
| 2010/0070875 A1 | 3/2010 | Turski et al. | |
| 2010/0100899 A1 | 4/2010 | Bradbury et al. | |
| 2010/0162171 A1 | 6/2010 | Felt et al. | |
| 2010/0191844 A1 | 7/2010 | He et al. | |
| 2010/0274847 A1* | 10/2010 | Anderson | H04L 67/24 709/203 |
| 2010/0306185 A1 | 12/2010 | Smith et al. | |
| 2011/0078259 A1 | 3/2011 | Rashad et al. | |
| 2011/0086627 A1 | 4/2011 | Khosravi | |
| 2011/0119593 A1* | 5/2011 | Jacobson | G06Q 30/02 715/736 |
| 2011/0173569 A1* | 7/2011 | Howes | G06F 16/9574 715/835 |
| 2011/0252383 A1 | 10/2011 | Miyashita | |
| 2011/0254792 A1* | 10/2011 | Waters | G06F 1/1694 345/173 |
| 2011/0288868 A1* | 11/2011 | Lloyd | H04M 1/271 704/251 |
| 2012/0030588 A1* | 2/2012 | Sinha | G06Q 50/01 715/752 |
| 2012/0054631 A1* | 3/2012 | Nurmi | G06F 3/0481 715/744 |
| 2012/0063585 A1* | 3/2012 | Gravino | H04M 1/2757 379/218.01 |
| 2012/0078916 A1* | 3/2012 | Tseng | G06F 16/29 707/748 |
| 2012/0084461 A1 | 4/2012 | Athias et al. | |
| 2012/0110474 A1* | 5/2012 | Chen | G06Q 10/10 715/753 |
| 2012/0150970 A1 | 6/2012 | Peterson et al. | |
| 2012/0192090 A1* | 7/2012 | Patterson | G06F 3/0481 715/764 |
| 2012/0197871 A1 | 8/2012 | Mandel et al. | |
| 2012/0271822 A1 | 10/2012 | Schwendimann et al. | |
| 2013/0014021 A1 | 1/2013 | Bau et al. | |
| 2013/0120278 A1* | 5/2013 | Cantrell | G06F 3/0416 345/173 |

\* cited by examiner

PRESENTING FAVORITE CONTACTS INFORMATION TO A USER OF A COMPUTING DEVICE

CROSS-REFERENCE TO RELATED APPLICATIONS

This application is a continuation of and claims the benefit of U.S. Non-Provisional application Ser. No. 13/528,697, filed Jun. 20, 2012, entitled "Presenting Favorite Contacts Information to a User of a Computing Device," by J. Bonforte, which claims priority to U.S. Provisional Application Ser. No. 61/499,652, filed Jun. 21, 2011, entitled "Presenting Favorite Contacts Information to a User of a Computing Device," by J. Bonforte, the entire contents of which applications are incorporated by reference as if fully set forth herein.

The present application is related to U.S. patent application Ser. No. 12/792,698, filed Jun. 2, 2010, entitled "SELF POPULATING ADDRESS BOOK," by Smith et al., which was also published as U.S. Patent Publication No. 2010/0306185 on Dec. 2, 2010, the entire contents of which applications are incorporated by reference as if fully set forth herein.

The present application is also related to U.S. Patent Application Ser. No. 61/423,052, filed Dec. 14, 2010, entitled "SENDER-BASED RANKING OF PERSON PROFILES AND MULTI-PERSON AUTOMATIC SUGGESTIONS," by P. Monaco, and also to U.S. Patent Publication No. 2012/0150979 published on Jun. 14, 2012, and having the same title and inventor as the foregoing provisional application, the entire contents of which applications are incorporated by reference as if fully set forth herein.

FIELD OF THE TECHNOLOGY

At least some embodiments disclosed herein relate to information processing systems in general, and more particularly, but not limited to, presenting information to a user regarding favorite contacts of the user.

BACKGROUND

Users of mobile devices such as Android and Apple iPhone devices typically send and receive email, voice and other messages to and from numerous other persons (e.g., friends or business associates). When the user of the mobile device desires to initiate a communication with one of these persons, the user in some cases may look at a list of favorites previously selected or created by the user (by manual selection) in order to choose a person for a new communication initiated from the mobile device.

SUMMARY OF THE DESCRIPTION

Systems and methods for presenting information to a user regarding favorite contacts of the user (e.g., a list of favorite contacts, as determined based on a relevancy ranking or some other correlation or association relative to the user) are described herein. Some embodiments are summarized in this section.

In one embodiment, a method includes storing a plurality of person profiles for persons referenced in communications received by a user of a computing device (e.g., a mobile device); selecting, using at least one processor (e.g., of a server or of a mobile device), a set of contacts (e.g., stored in a database on the server and/or the mobile device) from the plurality of person profiles based on a relevancy ranking, wherein the set of contacts is selected for display to the user on the computing device (e.g., a mobile device or a user terminal); and organizing, using the at least one processor, the set of contacts into at least two time groups, each time group associated with a different time period, wherein contacts will be displayed to the user within each time group based on a relevancy ranking for each contact within the time group.

The disclosure includes methods and apparatuses which perform these methods, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In one embodiment, a computing device (e.g., a mobile device) owned by a user stores data (e.g., in a database in the form of person profiles) associated with prior communications and/or other activity of the user on the mobile device (e.g., data extracted from prior emails received by the user). Alternatively, the data may be stored on a server associated with the mobile device. A display of favorite contacts is presented to the user. The display organizes the contacts based on relevancy for two or more different time periods (i.e., a corresponding time period over which prior data in the database is analyzed for determining and ranking the favorite contacts).

One time period may be for "All Time" (i.e., the entire history of all communications by the user with others). The other time period may be a predefined time period such as "Last 10 Days" or "Today". The favorite contacts are presented in a ranked order within each time period grouping based on a relevancy ranking for each contact (i.e., one person may be ranked highest in the "Today" grouping, but ranked lower in the "All Time" grouping). Also, the relevancy ranking criteria may be selected to be different for each grouping. The relevancy ranking may be based, for example, on a relevancy system as described in U.S. patent application Ser. No. 12/792,698, incorporated by reference above.

The user may scroll through a list of contacts for each grouping by moving a finger left to right or by using another predefined user action. This list may be greater in number than that number that is initially displayed on a single screen (e.g., the list may be 30 contacts or some other predefined number of contacts).

In another embodiment, the user may be further presented with an ability to navigate favorite contacts in an hierarchical manner using the favorite contacts that are initially displayed (i.e., displayed on the first or top screen). More specifically, the user may tap and hold (or use some other predefined user interface action) to cause the presentation of an additional subset of information for a given favorite contact. This subset of information includes a list of contacts most closely-associated with the selected favorite contact (e.g., as determined by the user's prior communications in the database). The closeness of association may be determined by relevancy as described herein and/or by other correlation or association approaches.

The user may tap on any of the persons listed to initiate a communication or get other information about that person (e.g., a person profile). This other information may itself include yet another list of contacts most closely associated with that person. Thus, a hierarchy of favorite contacts may be navigated by the user by tapping and holding (or otherwise selecting) on each of a series of contacts. This provides a convenient way to locate contact information for a person based on prior relationship data (e.g., as built up from prior communications, social network graphs or data, or other activity of the user).

After tapping and holding, other information that may be presented for any selected contact includes various ways of contacting that person (e.g., email, phone, or text message), which may be ranked in order of greatest frequency of use between the user and contact as determined from historical data (over all time or over another time period).

Numerous examples of various types of data (e.g., person profiles for callers associated with the user) that may be collected in a database as mentioned above for the user are described in U.S. patent application Ser. No. 14/792,698, incorporated by reference above. This data may be stored on the mobile device and/or on a server associated with or otherwise communicating with the mobile device.

In one embodiment, a mobile device of a user stores data (e.g., in a database in the form of person profiles) associated with prior communications and/or other activity of the user on the mobile device (e.g., data extracted from one or more of the following: prior communications such as email or text messages, voice messages, or other documents or information received by the user from the user's friends or other persons such as work associates). The other activity may include the manner or ways in which the user operates the mobile device (e.g., what buttons or functions or activated when the user has previously interacted with the caller, what online service is used by the user when previously interacting with the caller, etc.). This stored data will be used for determining relevancy of the favorite contacts to present to the user and/or of the types of communication options to present (e.g., voice versus text message).

Figure 1:
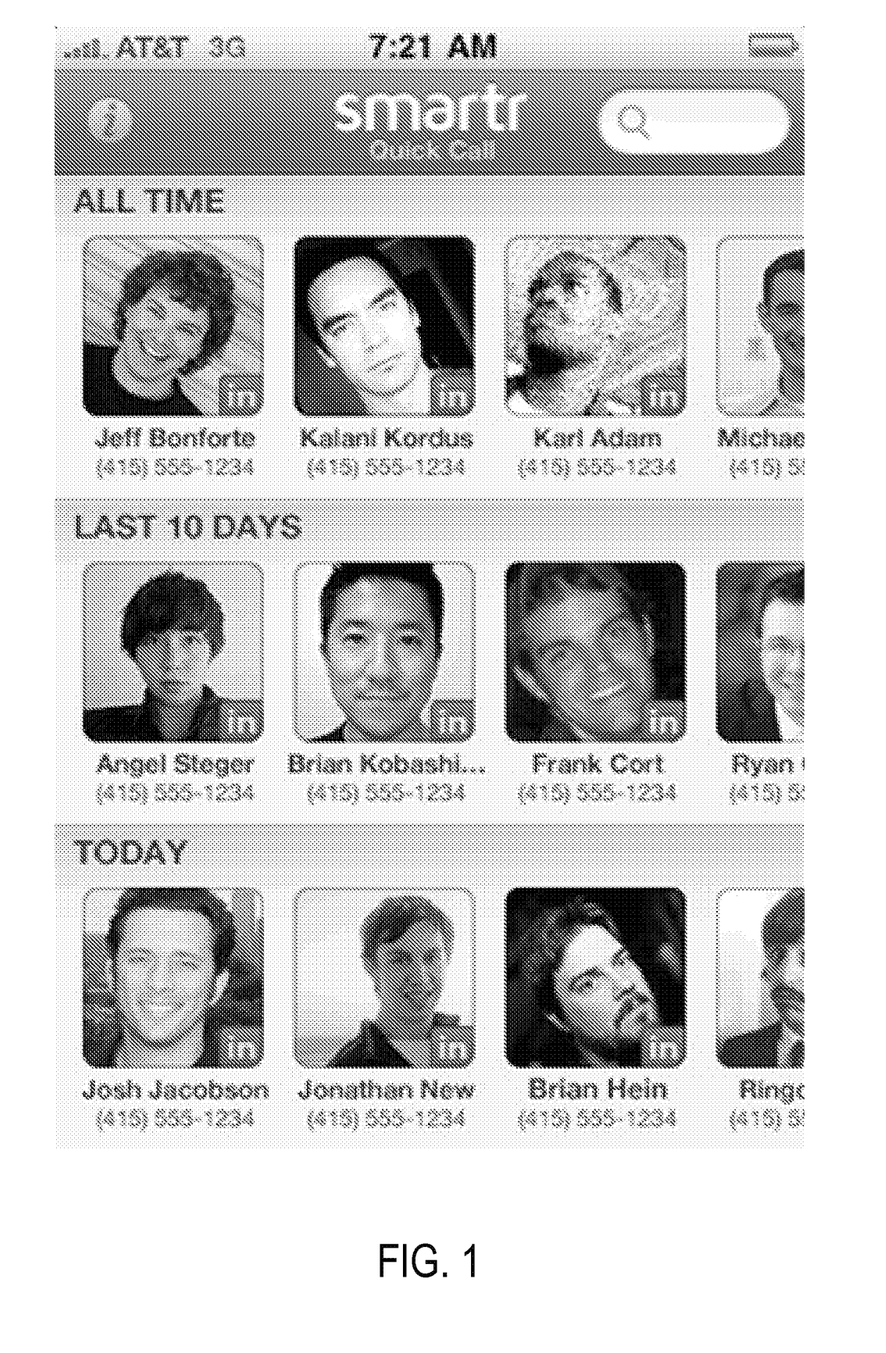
FIG. 1 shows an example of a display screen provided to a user of a mobile device for navigating and selecting from favorite contacts according to one embodiment.

FIG. 1 shows an example of a display screen provided to a user of a mobile device for navigating and selecting from favorite contacts (e.g., Jeff Bonforte, Angel Steger, and Josh Jacobson) according to one embodiment. As discussed above, favorite contacts are presented in three groups (All Time, Last 10 Days, and Today). This display screen is presented as a single screen on a smart phone or other mobile device (or even other computing device such as tablet or desktop), which may include a touch screen interface. Additional contacts may be scrolled onto the screen by a finger motion on a touch screen, such as discussed above.

As an example, the user may tap and hold (using a touch screen interface) on the image of Jeff Bonforte to see additional information (not shown) about Jeff Bonforte, including a list of related contacts (e.g., his brothers and sisters). A contact for a brother may then be tapped and held to present yet another list of related contacts (e.g., the children and wife of this brother) (not shown). This may continue for many levels (not shown), to the extent of data available for presenting information to the user (e.g., to the extent of the user database of stored history data or other contact data). At any point in the hierarchy, a quick tap (or other defined action) may be used to initiate a communication with the selected contact (e.g., a phone call).

In an even more specific, non-limiting example, the top line in FIG. 1 is a list of all the people the user knows ranked in order of relevancy over all time (i.e., the most important people based on prior communications over a long period of time).

The next list of contacts below that is based on the last 10 days. This list is de-duped (i.e., no duplicates are presented again) against the user's All Time list, and shows people that are most relevant to the user over the last 10 days (the relevancy for people in this list may be different than the relevancy determined for people in the All Time list).

The bottom list is for today's activity (e.g., phone behavior associated within a very short time period of the last 24 hours). Email activity or calendar information combined with email activity may be used as some of the criteria in selecting the persons in this list (relevancy also may be used).

In FIG. 1, the user can scroll each individual group (e.g., left or right) to list out or access a larger number of people. This is also a smart favorites list. In other words, if the user touches quickly on any one person, the mobile device proceeds to automatically call that person and does so using the most relevant or frequently used phone number or other way to contact that person based on the previous history of communications of the user with that person.

If the user taps and holds on the person, the mobile device presents the many ways that the user can reach that person, and also lists a predefined number of people that the user and the person have in common (not shown). This is a convenient and faster way to get in touch with someone as compared to prior approaches—the list of people is ranked in order by relevancy and the user can go down multiple levels.

The prior user history is examined to determine the most common form of communication (e.g., email, text message, or voice) of the user. This may be done for a predetermined time period, such as a set number of hours, days, or weeks. Then, that most common form is used for the immediate tap calling, or is presented in order as the number one choice when options are presented to the user.

The above approach may be extended to companies or other organizations, and even to particular topics (e.g., the user may tap and hold on a company icon, and people relevant to the company are listed in ranked order of relevance to the user).

Figure 2:
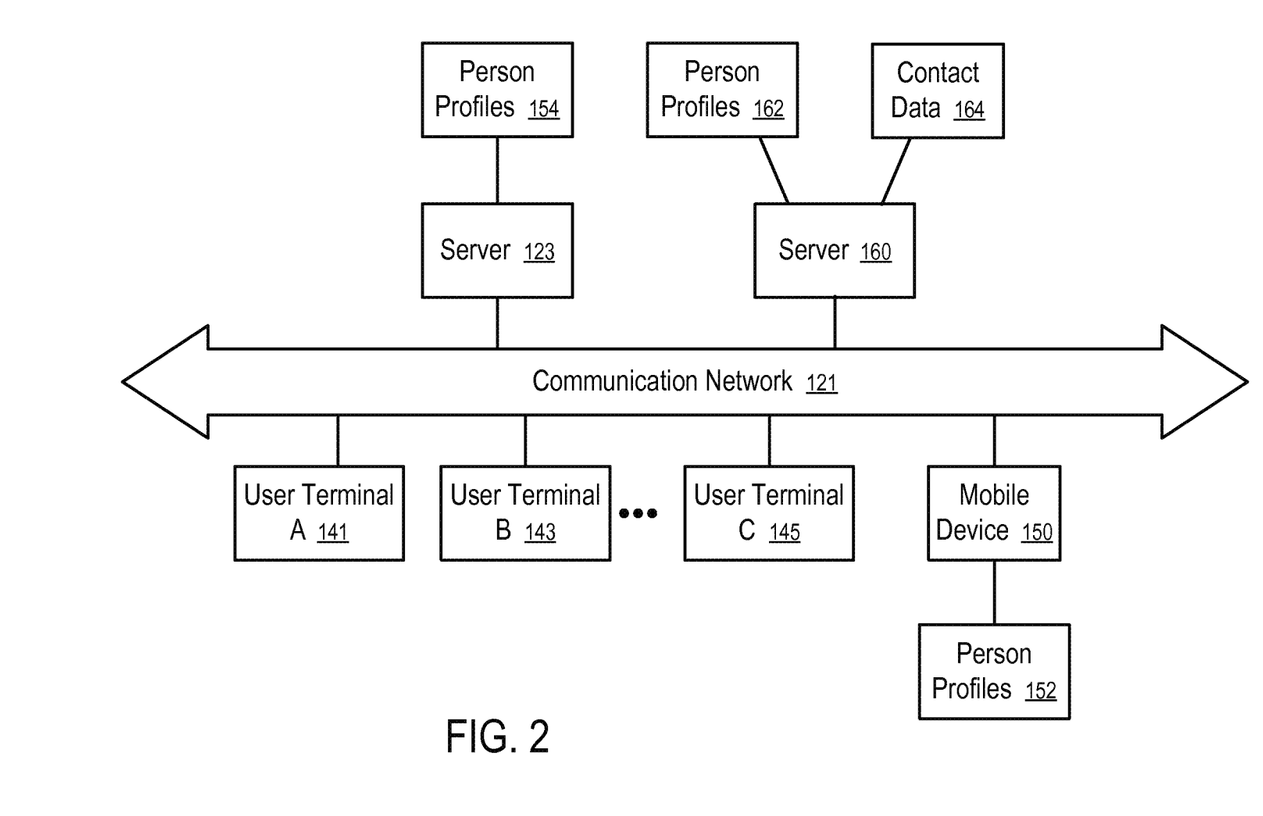
FIG. 2 shows a system to present information to a user regarding favorite or most closely-associated contacts of the user according to one embodiment.

FIG. 2 shows a system to present information to a user regarding favorite or most closely-associated contacts of the user, such as by display on a computing device of the user (e.g., a mobile device 150 such as an iPhone device), according to one embodiment. In FIG. 2, the user terminals (e.g., 141, 143, . . . , 145) and/or mobile devices including mobile device 150 are used to access a server 123 over a communication network 121.

The server 123 may include one or more web servers (or other types of data communication servers) to communicate with the user terminals (e.g., 141, 143, . . . , 145) and/or mobile devices.

The server 123 may be connected to a data storage facility to store user provided content, such as multimedia content, navigation data, preference data, etc. The server 123 may also store or have access to stored person profiles 154.

Person profiles 154 (and/or person profiles 162 and person profiles 152) may be created and updated based on email or other communications to and from mobile device 150 and other mobile devices of various users. In an alternative embodiment, person profiles 152 may be stored in a memory of mobile device 150. During operation, mobile device 150 may access and use person profiles obtained locally from mobile device 150 or obtained over communication network 121 from server 123 (and/or server 160).

Server 160 may store person profiles 162, which in some embodiments may include profiles received from mobile device 150 and/or server 123. Some or all of person profiles 162 may also be received from other computing devices not illustrated in FIG. 2. Person profiles 162 and/or contact data 164 (stored at server 160) may be accessed and used (e.g., by mobile device 150) for relevancy rankings and/or presentation of contacts as described herein.

Although FIG. 2 illustrates an example system implemented in client server architecture, embodiments of the disclosure can be implemented in various alternative architectures. For example, the system can be implemented via a peer to peer network of user terminals, where content and data are shared via peer to peer communication connections.

In some embodiments, a combination of client server architecture and peer to peer architecture can be used, in which one or more centralized servers may be used to provide some of the information and/or services and the peer to peer network is used to provide other information and/or services. Thus, embodiments of the disclosure are not limited to a particular architecture.

Figure 3:
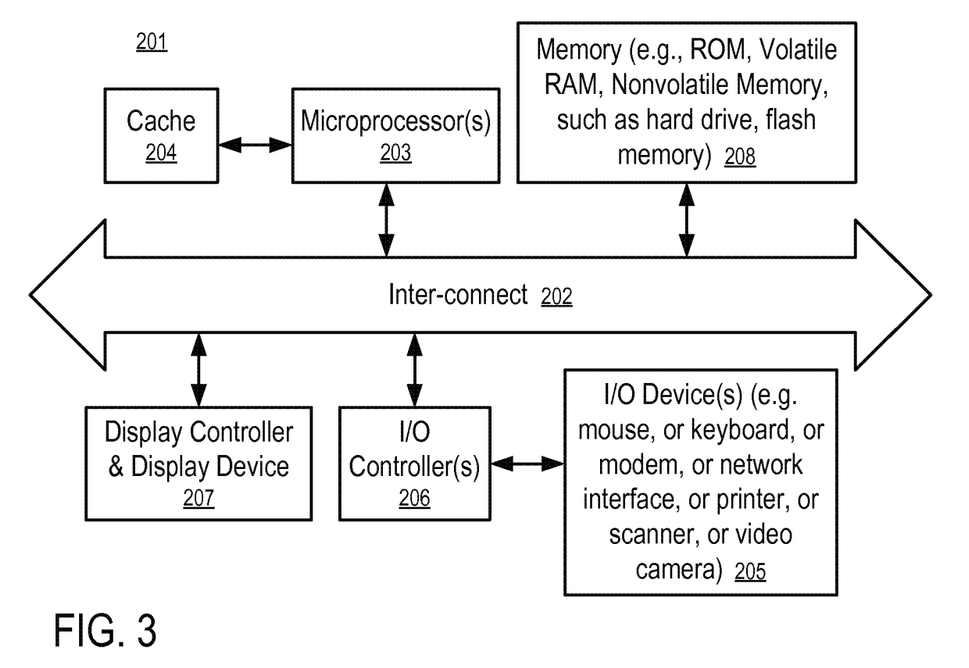
FIG. 3 shows a block diagram of a data processing system which can be used in various embodiments.

FIG. 3 shows a block diagram of a data processing system which can be used in various embodiments (e.g., to implement server 123 or server 160). While FIG. 3 illustrates various components of a computer system, it is not intended to represent any particular architecture or manner of interconnecting the components. Other systems that have fewer or more components may also be used.

In FIG. 3, the system 201 includes an inter-connect 202 (e.g., bus and system core logic), which interconnects a microprocessor(s) 203 and memory 208. The microprocessor 203 is coupled to cache memory 204 in the example of FIG. 3.

The inter-connect 202 interconnects the microprocessor(s) 203 and the memory 208 together and also interconnects them to a display controller and display device 207 and to peripheral devices such as input/output (I/O) devices 205 through an input/output controller(s) 206. Typical I/O devices include mice, keyboards, modems, network interfaces, printers, scanners, video cameras and other devices which are well known in the art.

The inter-connect 202 may include one or more buses connected to one another through various bridges, controllers and/or adapters. In one embodiment the I/O controller 206 includes a USB (Universal Serial Bus) adapter for controlling USB peripherals, and/or an IEEE-1394 bus adapter for controlling IEEE-1394 peripherals.

The memory 208 may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used. In one embodiment, a data processing system as illustrated in FIG. 3 is used to implement a server.

In one embodiment, a data processing system as illustrated in FIG. 3 is used to implement a user terminal. A user terminal may be in the form of a personal digital assistant (PDA), a cellular phone or other mobile device, a notebook computer or a personal desktop computer.

In some embodiments, one or more servers of the system can be replaced with the service of a peer to peer network of a plurality of data processing systems, or a network of distributed computing systems. The peer to peer network, or a distributed computing system, can be collectively viewed as a server data processing system.

Embodiments of the disclosure can be implemented via the microprocessor(s) 203 and/or the memory 208. For example, the functionalities described can be partially implemented via hardware logic in the microprocessor(s) 203 and partially using the instructions stored in the memory 208. Some embodiments are implemented using the microprocessor(s) 203 without additional instructions stored in the memory 208. Some embodiments are implemented using the instructions stored in the memory 208 for execution by one or more general purpose microprocessor(s) 203. Thus, the disclosure is not limited to a specific configuration of hardware and/or software.

Figure 4:
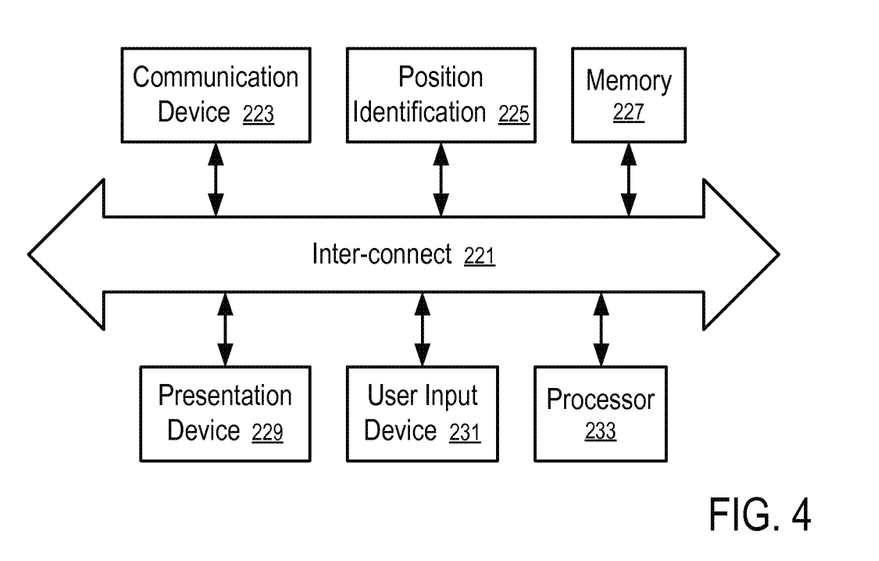
FIG. 4 shows a block diagram of a user device according to one embodiment.

FIG. 4 shows a block diagram of a user device (e.g., mobile device 150) according to one embodiment. In FIG. 4, the user device includes an inter-connect 221 connecting the presentation device 229, user input device 231, a processor 233, a memory 227, a position identification unit 225 and a communication device 223.

In FIG. 4, the position identification unit 225 is used to identify a geographic location for user content created for sharing. The position identification unit 225 may include a satellite positioning system receiver, such as a Global Positioning System (GPS) receiver, to automatically identify the current position of the user device.

In FIG. 4, the communication device 223 is configured to communicate with a server. In one embodiment, the user input device 231 is configured to generate user data content. The user input device 231 may include a text input device, a still image camera, a video camera, and/or a sound recorder, etc.

Various further embodiments are now here described. In one embodiment, a method, comprises: storing a plurality of person profiles for persons referenced in communications received by a user of a mobile device; selecting, using at least one processor, a set of contacts from the plurality of person profiles based on a relevancy ranking, wherein the set of contacts is selected for display to the user on the mobile device; and organizing, using the at least one processor, the set of contacts into at least two time groups, each time group associated with a different time period (e.g., today, the last ten days, or all time prior to the present moment), wherein contacts will be displayed to the user within each time group based on a relevancy ranking for each contact within the time group.

In one embodiment, a server includes the at least one processor, and the method further comprises sending the set of contacts to the mobile device for display. In one embodiment, the method further comprises storing data associated with prior activities of the user on the mobile device, and the selecting the set of contacts is further based on the stored data.

In one embodiment, the mobile device includes the at least one processor, and the method further comprises presenting, using a display of the mobile device, the set of contacts to the user. The presenting may comprise displaying the contacts for each time group in a respective horizontal row for viewing by the user. The at least one processor may be configured to permit the user to scroll the contacts in the respective horizontal row for each time group in a left or right direction using a touch screen interface of the mobile device.

In one embodiment, the method further comprises receiving a predefined user interface action from the user to select a contact from the set of contacts, and in response to the action, presenting to the user on the display a list of contacts most closely-associated with the selected contact. The list of contacts may be selected from the plurality of person profiles. The most closely-associated contacts may be determined using relevancy rankings of the plurality of person profiles.

In one embodiment, a non-transitory computer-readable storage medium stores computer-readable instructions, which when executed, cause a computing apparatus to: store a plurality of person profiles for persons referenced in communications received by a user of a mobile device; select, using at least one processor, a set of contacts from the plurality of person profiles based on a relevancy ranking, wherein the set of contacts is selected for display to the user on the mobile device; and organize, using the at least one processor, the set of contacts into at least two time groups, each time group associated with a different time period, wherein contacts will be displayed to the user within each time group based on a relevancy ranking for each contact within the time group.

In one embodiment, a server includes the at least one processor, and the instructions further cause the computing apparatus to send the set of contacts to the mobile device for display. In one embodiment, the instructions further cause the computing apparatus to store data associated with prior activities of the user on the mobile device, and the selecting the set of contacts is further based on the stored data.

In one embodiment, a system comprises: at least one processor; and memory storing instructions configured to instruct the at least one processor to: store a plurality of person profiles for persons referenced in communications received by a user of a mobile device; select a set of contacts from the plurality of person profiles based on a relevancy ranking, wherein the set of contacts is selected for display to the user on the mobile device; and organize the set of contacts into at least two time groups, each time group associated with a different time period, wherein contacts will be displayed to the user within each time group based on a relevancy ranking for each contact within the time group.

In one embodiment, the system further comprises a display, and the instructions are further configured to instruct the at least one processor to present, using the display, the set of contacts to the user. In one embodiment, the presenting comprises displaying the contacts for each time group in a respective horizontal row for viewing by the user.

In one embodiment, the instructions are further configured to instruct the at least one processor to permit the user to scroll the contacts in the respective horizontal row for each time group in a left or right direction using a touch screen interface. In one embodiment, the instructions are further configured to instruct the at least one processor to receive a predefined user interface action from the user to select a contact from the set of contacts, and in response to the action, present to the user on the display a list of contacts most closely-associated with the selected contact.

The list of contacts may be selected from the plurality of person profiles. The most closely-associated contacts may be determined using relevancy rankings of the plurality of person profiles. The system may further comprise a database storing the plurality of person profiles.

In this description, various functions and operations may be described as being performed by or caused by software code to simplify description. However, those skilled in the art will recognize what is meant by such expressions is that the functions result from execution of the code by a processor, such as a microprocessor. Alternatively, or in combination, the functions and operations can be implemented using special purpose circuitry, with or without software instructions, such as using an Application-Specific Integrated Circuit (ASIC) or a Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a tangible machine readable medium includes any mechanism that provides (e.g., stores) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method, comprising:
   in response to receiving first communications from persons, extracting information from each communication of the first communications;
   storing a plurality of person profiles for the persons, wherein each profile of the person profiles includes information extracted from at least one of the first communications;
   selecting, using at least one processor, a first set of contacts from the plurality of person profiles for a first time group and a second set of contacts from the plurality of person profiles for a second time group, wherein the first set of contacts is selected based on a first frequency of communications received from the first set of contacts and the second set of contacts is selected based on a second frequency of communications received from the second set of contacts;
   determining a first relevancy ranking for each of the first set of contacts using a first criteria and a second relevancy ranking for each of the second set of contacts using a second criteria, the first and second relevancy rankings determined based on extracted information associated with a respective contact;
   organizing, using the at least one processor, each of the first set of contacts in an order for display based on the first relevancy ranking and each of the second set of contacts in an order for display based on the second relevancy ranking;
   displaying, by the at least one processor, the first set in a first horizontal row for the first time group; and
   displaying, by the at least one processor, the second set in a second horizontal row for the second time group, the first horizontal row and the second horizontal row simultaneously displayed on a same screen of a user interface, wherein a first ranked order of the first set of contacts is different than a second ranked order of the second set of contacts.

2. The method of claim 1, further comprising, in response to selection of a first contact from the first set of contacts, causing display of multiple options for communicating with the first contact, each of the options ranked in an order based on frequency of use in prior communications with the first contact.

3. The method of claim 1, further comprising, in response to selection of a selected contact from one of the first set of contacts or the second set of contacts, causing display of a list of persons, wherein the list of persons is re-ranked, the re-ranking comprising a ranking based on the selection of the selected contact and at least one of the first relevancy ranking and the second relevancy ranking.

4. The method of claim 1, further comprising presenting, on a display of a computing device, the first and second sets of contacts.

5. The method of claim 4, wherein the presenting comprises displaying each of the first and second sets of contacts in a respective horizontal row.

6. The method of claim 5, further comprising enabling a user to scroll contacts in the respective horizontal row in a left or right direction.

7. The method of claim 1, further comprising de-duping at least one of the first or second sets of contacts prior to display.

8. The method of claim 1, wherein at least one of the first communications is a text message.

9. The method of claim 1, wherein information extracted from at least one of the first communications comprises information extracted from a document.

10. The method of claim 1, further comprising storing an additional plurality of person profiles, the additional plurality of person profiles associated with an additional user, wherein each profile of the additional plurality of person profiles includes information extracted from at least one of second communications addressed to the additional user, and further includes data associated with prior activities of the additional user on a different computing device when interacting with a person corresponding to a profile of the person.

11. A non-transitory computer-readable storage medium storing computer-readable instructions, which when executed, cause a computing apparatus to:
- in response to receiving communications from persons, extract information from each of the communications;
- store a plurality of person profiles for the persons, wherein each profile of the person profiles includes information extracted from at least one of the communications;
- select first set of contacts from the plurality of person profiles for a first time group and a second set of contacts from the plurality of person profiles for a second time group, wherein the first set of contacts is selected based on a first frequency of communications received from the first set of contacts and the second set of contacts is selected based on a second frequency of communications received from the second set of contacts;
- determine a first relevancy ranking for each of the first set of contacts using a first criteria and a second relevancy ranking for each of the second set of contacts using a second criteria, the first and second relevancy rankings determined based on extracted information associated with a respective contact;
- organize each of the first set of contacts in an order for display based on the first relevancy ranking and each of the second set of contacts in an order for display based on the second relevancy ranking;
- display the first set in a first horizontal row for the first time group; and
- display the second set in a second horizontal row for the second time group, the first horizontal row and the second horizontal row simultaneously displayed on a same screen of a user interface, wherein a first ranked order of the first set of contacts is different than a second ranked order of the second set of contacts.

12. The storage medium of claim 11, wherein the instructions further cause the computing apparatus to:
- send the first and second sets of contacts to a computing device for display on the same screen; and
- in response to selection of a selected contact from one of the first set of contacts or the second set of contacts, cause display of a list of persons, wherein the list of persons is re-ranked, the re-ranking comprising a ranking based on the selection of the selected contact and at least one of the first relevancy ranking and the second relevancy ranking.

13. The storage medium of claim 11, wherein the instructions further cause the computing apparatus to, in response to the selection of a second contact from the first set of contacts, cause display of multiple options for communicating with the second contact.

14. A system, comprising:
- a display;
- at least one processor; and
- memory storing instructions configured to instruct the at least one processor to:
- in response to receiving first communications from persons, extract information from each communication of the first communications;
- store a plurality of person profiles for the persons, wherein each profile of the person profiles includes information extracted from at least one of the first communications;
- select a first set of contacts from the plurality of person profiles for a first time group and a second set of contacts from the plurality of person profiles for a second time group, wherein the first set of contacts is selected based on a first frequency of communications received from the first set of contacts and the second set of contacts is selected based on a second frequency of communications received from the second set of contacts;
- determine a first relevancy ranking for each of the first set of contacts using a first criteria and a second relevancy ranking for each of the second set of contacts using a second criteria, the first and second relevancy rankings determined based on extracted information associated with a respective contact;
- organize each of the first set of contacts in an order for display based on the first relevancy ranking and each of the second set of contacts in an order for display based on the second relevancy ranking;
- display the first set in a first horizontal row for the first time group; and
- display the second set in a second horizontal row for the second time group, the first horizontal row and the second horizontal row simultaneously displayed on a same screen of a user interface, wherein a first ranked order of the first set of contacts is different than a second ranked order of the second set of contacts.

15. The system of claim 14, wherein the instructions are further configured to instruct the at least one processor to display each of the first and second sets of contacts for simultaneous viewing by a user.

16. The system of claim 15, further comprising a touch screen interface to display the first and second sets of contacts, and wherein the instructions are further configured to instruct the at least one processor to enable scrolling of contacts in a respective horizontal row in a left or right direction.

17. The system of claim 14, wherein the instructions are further configured to instruct the at least one processor to, in response to selection of a first contact from the first set of contacts, cause display of multiple options for communicating with the first contact, each of the options ranked in an order based on frequency of use in prior communications.

18. The system of claim 14, further comprising a database storing the plurality of person profiles, and wherein the instructions are further configured to instruct the at least one processor to, in response to selection of a selected contact from one of the first set of contacts or the second set of contacts, cause display of a list of persons, wherein the list of persons is re-ranked, the re-ranking comprising a ranking based on the selection of the selected contact and at least one of the first relevancy ranking and the second relevancy ranking.

19. The system of claim 14, wherein information extracted from the first communications comprises information extracted from a document.

20. The system of claim 14, wherein the instructions are further configured to instruct the at least one processor to display each of the first and second sets of contacts in a respective horizontal row for viewing.

* * * * *